United States Patent [19]

Potts

[11] Patent Number: 4,962,830
[45] Date of Patent: Oct. 16, 1990

[54] DUAL TRANSMISSION-FLUID-LEVEL MAINTENANCE SYSTEM

[76] Inventor: Frank Potts, 15331 Palomino Blvd., Fountain Hills, Ariz. 85268

[21] Appl. No.: 408,871

[22] Filed: Sep. 18, 1989

[51] Int. Cl.⁵ .................. F01M 1/16; F01M 11/12
[52] U.S. Cl. .................. 184/6.4; 184/6.12; 184/103.1; 184/104.3; 74/467; 165/104.32
[58] Field of Search ............ 165/104.32; 180/339; 184/6.12, 103.1, 104.1, 104.2, 104.3, 6.4; 74/467

[56] References Cited

U.S. PATENT DOCUMENTS

| | | | |
|---|---|---|---|
| 1,428,017 | 9/1922 | Edwards | 184/103.1 |
| 2,279,285 | 4/1942 | Worth | 184/104.1 |
| 3,874,183 | 4/1975 | Tabet | 62/3 |
| 4,169,519 | 10/1979 | Hirt et al. | 184/6.12 |
| 4,217,926 | 8/1980 | Van Gorder | 137/389 |
| 4,632,080 | 12/1986 | Hurner | 184/6.4 |
| 4,642,604 | 2/1987 | Glesmann et al. | 340/60 |
| 4,724,926 | 2/1988 | Collins | 184/1.5 |
| 4,750,456 | 6/1988 | Ladrach | 123/196 |
| 4,751,858 | 6/1988 | Iwatsuki | 74/867 |

*Primary Examiner*—Albert W. Davis, Jr.
*Attorney, Agent, or Firm*—Don J. Flickinger; Jordan M. Meschkow; Lowell W. Gresham

[57] ABSTRACT

A system for use in connection with an automatic transmission of a motorized vehicle is disclosed. The system includes an accumulator which is sealed except for two openings therein. The accumulator is positioned above an operational fluid level of the transmission, with the openings pointing downward. One of the two openings couples to a high pressure fluid line, which extends between an automatic transmission and a heat exchanger. The other of the two openings couples to a low pressure fluid line, which extends between the automatic transmission and the heat exchanger. When the vehicle's motor operates, a pump within the automatic transmission pressurizes these two fluid lines and causes transmission fluid to fill the accumulator. When the vehicle's motor does not operate, the pump does not operate, and the fluid lines depressurize. The depressurizing causes fluid to drain from the accumulator and overfill the transmission. The overfilling of the transmission permits safe operation of the transmission while towing the vehicle. As soon as the vehicle is operated under its own power, excess fluid is again pumped into the accumulator.

20 Claims, 1 Drawing Sheet

4,962,830

DUAL TRANSMISSION-FLUID-LEVEL MAINTENANCE SYSTEM

TECHNICAL FIELD OF THE INVENTION

The present invention relates generally to motorized vehicles having automatic transmissions. More specifically, the present invention relates to operating these transmissions so that such vehicles may be either safely towed or driven under their own power.

BACKGROUND OF THE INVENTION

Conventional automatic transmissions include transmission fluid, which is maintained within operational volume limits, and a pump, which is driven by rotary motion from a vehicle's engine. The pump circulates the fluid through the transmission and the vehicle's heat exchanger. Among other things, this fluid provides lubrication for the transmission. However, the fluid must be circulating so that all components which need lubrication receive it.

When a vehicle's engine is not operating, the pump does not operate, and the fluid does not circulate. If components within the transmission continue to move against one another while the engine is not operating, adequate lubrication may not reach various critical transmission components. Unless special precautions are taken, this happens any time a vehicle's wheels rotate due to forces other than those supplied by the vehicle's engine. Thus, most automotive manufacturer's caution against towing, pushing, or coasting a vehicle for lengthy distances or at high speeds.

These characteristics of automatic transmissions present a long-recognized problem to persons who wish to tow vehicles having such automatic transmissions. While a short distance, such as to a nearby repair shop, may be traversed at slow speeds without great inconvenience, the towing prohibition imposes a great burden when a vehicle is to be towed a long distance. Conventionally, either of two types of solutions have been applied to this problem.

The first type of solution attempts to prevent a transmission from operating while a vehicle is being towed. One example of this type of solution calls for the use of a trailer. At least the vehicle's wheels to which the transmission couples are placed and held stationary on the trailer while the trailer's wheels rotate to tow the vehicle. This solution is particularly undesirable because the trailer represents a large expense, the vehicle is typically difficult to stow upon the trailer, the trailer takes up valuable space when it is not being used, and the trailer adds a significant weight penalty for a towing vehicle when it is being used.

Another example of preventing a transmission from operating disconnects a drive shaft so that the transmission does not couple to the vehicle's wheels. While this solution prevents a transmission from operating when the vehicle is being towed, it is undesirably inconvenient. Someone must perform work under the vehicle in order first to disconnect the drive shaft for towing and second to reconnect the drive shaft for operating the vehicle under its own power. This is a time consuming and dirty task which requires the availability of tools and a degree of mechanical aptitude. Consequently, this solution is too cumbersome and inflexible whenever the vehicle is towed more than rarely or by persons who are not comfortable performing mechanical tasks.

To address problems specific to disconnecting a drive shaft, an alternate solution incorporates a clutching mechanism in the vehicle's drive shaft. The clutching mechanism is typically operated from a control knob located in the driver's compartment. While the clutching mechanism makes decoupling the transmission from the vehicle's wheels much more convenient, it subjects the drive shaft to becoming unbalanced, and it adds a weak link to the vehicle's power train. Consequently the vehicle's reliability suffers.

In addition, the solutions which decouple a vehicle's drive shaft from its transmission simply cannot be applied to vehicles which do not have drive shafts. Since more and more vehicles are being manufactured as front wheel drive vehicles, which have transaxles rather than drive shafts, these solutions are available only for fewer and fewer vehicles. However, the second of the two types of solutions may be applied to either rear wheel drive or front wheel drive vehicles. This second type of solution continues to circulate transmission fluid when the vehicle is being towed, even though the transmission pump is not operational.

In one example of the second type of solution, an external pump is mounted in the vehicle and coupled to the vehicle's transmission through valves. This system includes an electrical controller and is powered from a towing vehicle. The controller operates the pump and valve and monitors the circulation of fluid for sufficient pressure to insure transmission lubrication. While this solution solves many problems related to the above-discussed techniques, which strive to decouple a drive shaft, it suffers from its own problems. For example, this solution is unduly complicated and expensive. It generally requires the services of a skilled mechanic for installation, and it includes several components which are prone to failure. In particular, the use of an external pump and of a wiring harness and control system which traverses the distance between the towed vehicle and a towing vehicle are highly undesirable.

SUMMARY OF THE INVENTION

Accordingly, it is a advantage of the present invention that an improved system for operating an automatic transmission is provided.

Another advantage of the present invention is that the present invention may be applied to both front wheel drive and rear wheel drive vehicles Yet another advantage is that the present invention allows a vehicle to be either driven under its own power or towed by another vehicle without requiring special precautions to be taken.

Still another advantage is that the present invention is highly reliable.

Yet another advantage is that the present invention overfills a transmission housing with transmission fluid so that adequate lubrication is maintained through splashing within the transmission while a vehicle is being towed.

Another advantage of the present invention is that the present invention is inexpensive and easy to install.

The above and other advantages of the present invention are carried out in one form by a fluid level maintenance apparatus which operates in connection with an automatic transmission system of a motor vehicle. The transmission system with which this apparatus operates includes a transmission housing that has a fluid inlet and a fluid outlet. This housing is dimensioned to retain an operational volume of fluid. A heat exchanger has a fluid inlet in fluid communication with the housing's fluid outlet, and the heat exchanger has a fluid outlet in fluid communication with the housing's fluid inlet. The transmission system with which this apparatus operates additionally includes a device for urging the fluid to move. This apparatus maintains the operational volume of fluid within the housing when the urging device is operational and supplies an additional volume of fluid to the housing when the urging device is inoperative. It specifically includes a container which has first and second openings. The container is dimensioned to hold the additional volume of fluid. A first coupling device couples the first opening to the housing fluid inlet, and a second coupling device couples the second opening to the housing fluid outlet.

The above and other advantages of the present invention are carried out in another form by a method of operating a motorized vehicle's transmission. This method permits the motorized vehicle to be selectively operated either under the vehicle's own power or in response to forces applied from externally to the vehicle. The method increases the quantity of transmission fluid in the transmission when the vehicle operates in response to forces applied from outside of the vehicle, and decreases the quantity of transmission fluid in the transmission when the vehicle operates under its own power.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
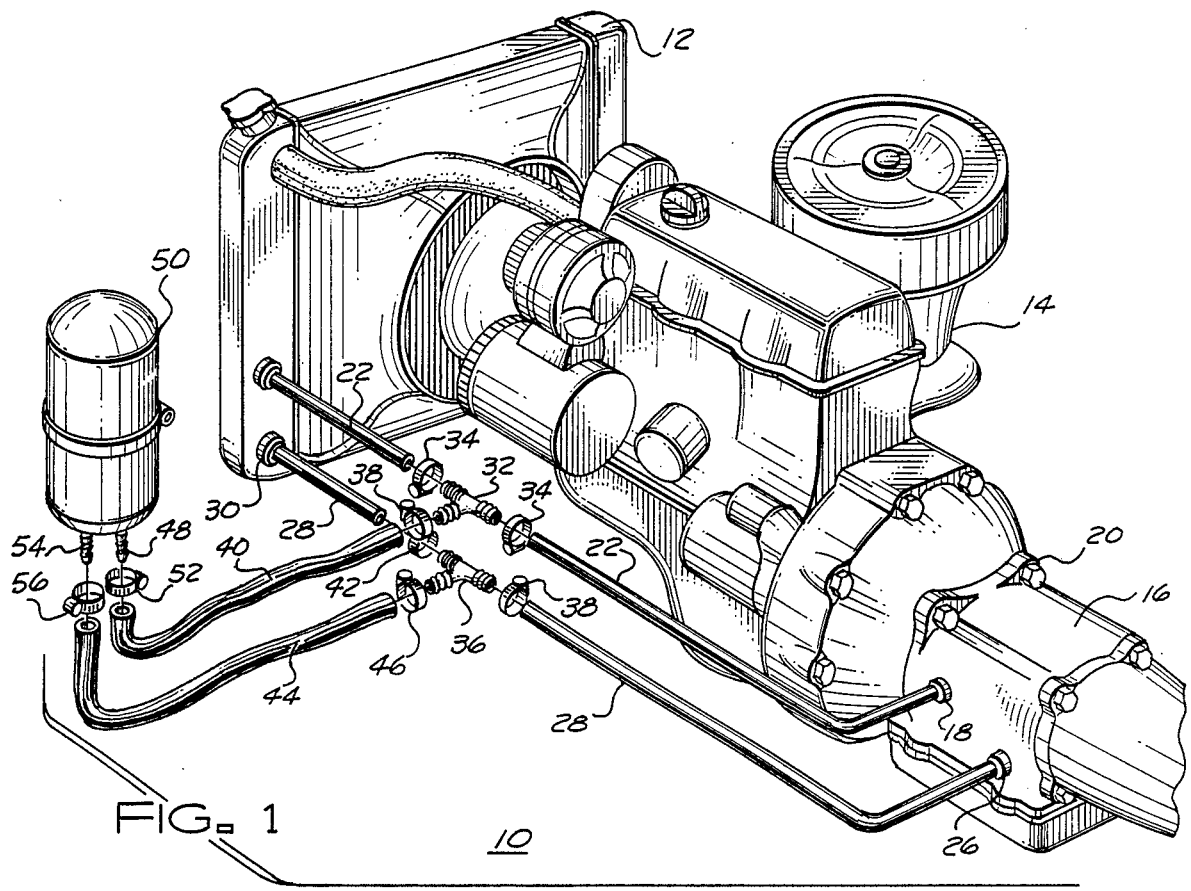
FIG. 1 shows an exploded view of the present invention in cooperation with under-hood components of a motorized vehicle.

As shown in FIG. 1, a motorized vehicle 10 equipped with the present invention includes the under-hood components of a radiator or heat exchanger 12, a motor 14, and an automatic transmission 16. In the preferred embodiment of the present invention, heat exchanger 12 couples to motor 14, and motor 14 couples to transmission 16, in a conventional manner. In addition, transmission 16 couples to heat exchanger 12. Specifically, a fluid outlet 18 from a housing 20 of transmission 16 couples through tube 22 to a fluid inlet 24 of heat exchanger 12. Likewise, a fluid inlet 26 into housing 20 of transmission 16 couples through tube 28 to a fluid outlet 30 of heat exchanger 12.

A "T" junction 32 is centrally located within tube 22 and is sealed thereto through clamps 34. Likewise, a "T" junction 36 is centrally located within tube 28 and is sealed thereto through clamps 38. Two ports of each of junctions 32 and 36 couple to tubes 22 and 28, respectively. A third port of junction 32 couples to a first opening of a tube 40 and is sealed thereto through a clamp 42. A third port of junction 36 couples to a first opening of a tube 44 and is sealed thereto through a clamp 46. A second opening of tube 40 couples to a port or opening 48 of an aocumulator 50 and is sealed thereto through a clamp 52. A second opening of tube 44 couples to a port or opening 54 of accumulator 50 and is sealed thereto through a clamp 56.

Figure 2:
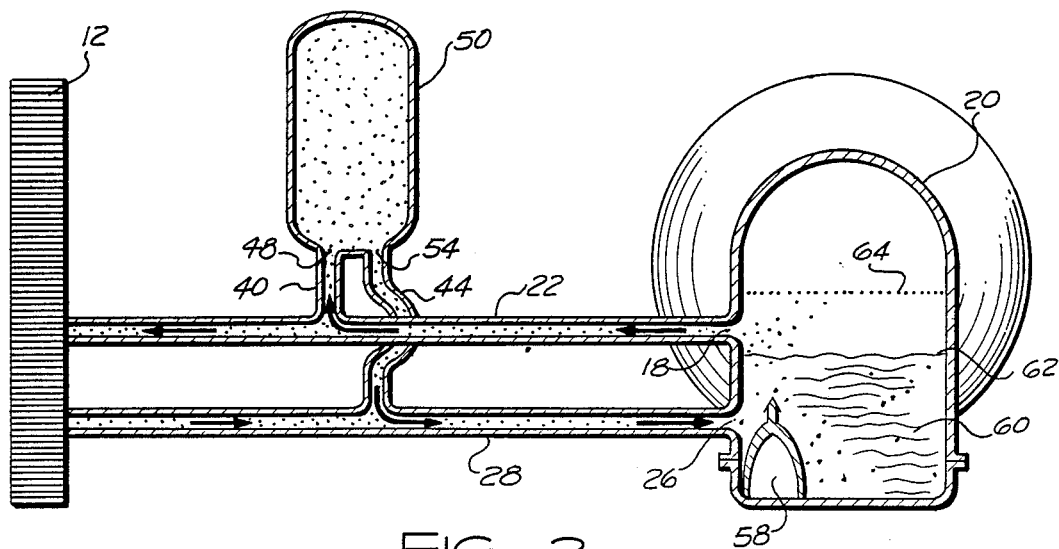
FIG. 2 shows a schematic view of fluid paths provided by the present invention.

FIG. 2 illustrates the operation of this invention by showing a schematic view of fluid paths among heat exchanger 12, transmission 16, and accumulator 50. An interior of housing 20 includes a pump 58 and automatic transmission fluid 60. The interior additionally includes numerous components which cooperate in transmitting power through transmission 16. Such components are not shown in FIG. 2 in order to clearly present the present invention. As is conventional with automatic transmission systems, pump 58 couples to such components, to fluid outlet 18, and to fluid inlet 26 to cause fluid 60 to circulate through such components and through heat exchanger 12. Moreover, as is conventional with automatic transmissions, pump 58 operates only when motor 14 (see FIG. 1) operates. Thus, when motor 14 is turned-off pump 58 is inoperative, and fluid 60 does not circulate through the components of transmission 16 or through heat exchanger 12.

The present invention maintains the quantity or volume of fluid 60 in housing 20 of transmission 16 within predetermined upper and lower limits while pump 58 operates. These limits are established by the manufacturer of transmission 16 and vary from vehicle 10 (see FIG. 1) to vehicle 10. Transmission 16 needs a quantity of fluid 60 which falls between these limits so that transmission 16 may be operated for extended periods of time without being damaged. This quantity of fluid 60 fills housing 20 of transmission 16 to an operational fluid level, denoted as level 62 in FIG. 2.

While pump 58 operates, fluid 60 travels out from housing 20 through tube 22 to accumulator 50 and heat exchanger 12. At the same time, fluid 60 travels back from accumulator 50 and heat exchanger 12 to housing 20 through tube 28. Due to the operation of pump 58, fluid 60 is typically under approximately 5-8 psi greater pressure within tube 22 than within tube 28 under steady state operating conditions. This pressure difference keeps fluid 60 circulating. Since accumulator openings 48 and 54 couple across this pressure difference, a greater volume of fluid 60 enters accumulator 50 at opening 48 than exits accumulator 50 at opening 54 until accumulator 50 completely fills with fluid 60. At this point, so long as pump 58 continues to operate, accumulator 50 remains full of fluid 60, and fluid 60 circulates through accumulator 50 as well as through heat exchanger 12. Accordingly, while pump 58 operates, the quantity of fluid 60 within housing 20 remains within operational limits, but an additional quantity of fluid 60 resides within accumulator 50.

As shown in the FIGURES, accumulator 50 resides a slight distance above operational fluid level 62. In addition, openings 48 and 54 are located toward the bottom of accumulator 50. When pump 58 is inoperative, the above-discussed pressure difference disappears. Consequently, when pump 58 is inoperative, fluid 60 drains out from accumulator 50 into housing 20. This draining occurs due to the force of gravity acting upon fluid 60 within accumulator 50. The draining of fluid 60 into housing 20 raises the volume of fluid 60 in housing 20 to a towing fluid level 64, indicated by a dotted line in FIG. 2.

Preferably, when level 64 is achieved, the volume of fluid 60 within housing 20 exceeds the manufacturer's upper limits. In other words, transmission 16 is overfull. While it would not be advisable to operate vehicle 10 (see FIG. 1) under its own power when fluid 60 is at towing fluid level 64, operating vehicle 10 under its own power causes fluid 60 to drop to operational fluid level 62, as discussed above.

On the other hand, vehicle 10 may be safely towed while fluid 60 is at towing level 64 without risking damage to transmission 16. Although pump 58 is inoperative, the present invention maintains fluid 60 on all critical components within transmission 16 due to the raised fluid level within transmission 16 in combination with splashing. This splashing occurs from rotary motion imparted to the components of transmission 16 through the output shaft (not shown) of transmission 16 when vehicle 10 is being towed. The precise additional quantity of fluid 6 required by the present invention is not critical. Empirical observations have shown that approximately one quart of fluid 60 over manufacturers' upper limits is a sufficient and desirable quantity for most passenger automobiles. Accordingly, in the preferred embodiment accumulator 50 is dimensioned to hold approximately one quart of fluid 60 when full.

In summary, the present invention provides an improved system for operating an automatic transmission. The present invention utilizes no valves, moving parts, or control systems. Thus, the present invention demonstrates excellent reliability. The present invention is inexpensive and easy to install because it utilizes only a few simple parts. Moreover, the present invention refrains from preventing operation of an automatic transmission while a vehicle is being towed. Rather, the present invention allows the transmission to operate and insures that a sufficient quantity of lubricating fluid is present in a transmission housing while a vehicle is being towed. The present invention is applicable to both front wheel drive and rear wheel drive vehicles. In addition, the present invention is permanently installed on a vehicle and requires no special precautions to be taken before towing the vehicle or before driving the vehicle under its own power.

The present invention has been described above with reference to a preferred embodiment. However, those skilled in the art will recognize that changes and modifications may be made in this preferred embodiment without departing from the scope of the present invention. For example, accumulator 50 could be configured to have openings on opposing ends. This and other changes and modifications which are obvious to those skilled in the art are intended to be included within the scope of the present invention.

What is claimed is:

1. A fluid level maintenance apparatus for use with an automatic transmission system of a motor vehicle, said transmission system including:
   a housing having a fluid inlet and a fluid outlet, said housing being dimensioned to retain an operational volume of a fluid,
      a heat exchanger having a fluid inlet and a fluid outlet, said heat exchanger fluid inlet being coupled to said housing fluid outlet, and said heat exchanger fluid outlet being coupled to said housing fluid inlet, and
      means, coupled to one of said housing fluid inlet and outlet, for urging movement of said fluid;
   said fluid level maintenance apparatus being for maintaining substantially said operational volume of said fluid in said housing when said urging means is operational and for supplying an additional volume of said fluid to said housing when said urging means is inoperative, said apparatus comprising:
      a container having first and second openings therein;
      means for coupling said first opening of said container to said housing fluid inlet; and
      means for coupling said second opening of said container to said housing fluid outlet, said container and at least one of said coupling means being collectively dimensioned to enclose a volume substantially equal to said additional volume of fluid.

2. A fluid level maintenance apparatus as claimed in Claim 1, wherein said container is configured so that said fluid enters and exits said container only at said first and second openings, collectively.

3. A fluid level maintenance apparatus as claimed in Claim 1 wherein said operational volume of said fluid fills said housing to an operational fluid level, and said container is positioned above said operational fluid level.

4. A fluid level maintenance apparatus as claimed in Claim 1 wherein said container is dimensioned to hold at least one quart of said fluid.

5. A fluid level maintenance apparatus as claimed in Claim 1 wherein said container is oriented so that at least one of said first and second openings is positioned proximate a bottom side of said container.

6. A fluid level maintenance apparatus as claimed in claim 1 wherein said container is located external to said housing and to said heat exchanger.

7. A system for alternately maintaining one of a relatively higher and a relatively lower quantity of fluid in an automatic transmission of a motor vehicle, said system comprising:
   a transmission housing having a fluid inlet and a fluid outlet, said transmission housing being configured so that said relatively lower quantity of said fluid fills said housing to an operational fluid level;
   a heat exchanger having a fluid inlet and a fluid outlet,
   said heat exchanger fluid inlet being coupled to said housing fluid outlet, and said heat exchanger fluid outlet being coupled to said housing fluid inlet;
   transmission fluid pumping means, coupled to one of said housing fluid inlet and outlet, for urging movement of said fluid;
   an accumulator having first and second openings therein, said accumulator being positioned above said operational fluid level and being positioned so that one of said first and second openings resides proximate a bottom portion of said accumulator, said accumulator being dimensioned to enclose a volume substantially equal to the difference between said relatively higher and relatively lower quantities of said fluid;
   means for coupling said first opening of said accumulator to said transmission fluid inlet; and
   means for coupling said second opening of said accumulator to said transmission fluid outlet.

8. A system as claimed in claim 7 wherein said accumulator is located external to said heat exchanger and said transmission housing.

9. In a motorized vehicle having an automatic transmission in which fluid is circulated by a pump, a method of increasing the quantity of said fluid in said transmission when said pump is inoperative and of decreasing the quantity of said fluid in said transmission when said pump is operative, said method comprising the steps of:
   pumping said fluid out of said transmission into an accumulator when said pump is operative; and draining said fluid from said accumulator into said transmission when said pump is inoperative.

10. A method as claimed in claim 9 wherein:

said automatic transmission couples to a heat exchanger through a relatively high pressure fluid circuit and a relatively low pressure fluid circuit; and said pumping step comprises the step of coupling said accumulator to said relatively high pressure fluid circuit.

11. A method as claimed in claim 10 wherein said pumping step additionally comprises the step of coupling said accumulator to said relatively low pressure fluid circuit.

12. A method as claimed in claim 9 wherein:

when said pump is operative, said fluid fills said transmission to an operational fluid level; and said draining step comprises the step of positioning said accumulator above said operational fluid level of said transmission.

13. A method as claimed in claim 9 wherein said draining step comprises the steps of:

configuring said accumulator so that an opening therein resides proximate a bottom side of said accumulator; and coupling said accumulator opening to said transmission.

14. A method as claimed in claim 9 wherein:

lubrication for operating said transmission when said pump is inoperative is obtained by increasing the quantity of said fluid in said transmission by a predetermined volume; and said method additionally comprises the step of dimensioning said accumulator to hold at least said predetermined volume.

15. A method of operating an automatic transmission of a motorized vehicle so that said motorized vehicle may be selectively operated in first and second modes of operation, said first mode of operation being under said vehicle's own power and said second mode of operation being in response to forces applied from outside of said vehicle, said method comprising the steps of:

increasing the quantity of transmission fluid in said transmission when said vehicle operates in said second mode; and decreasing the quantity of said transmission fluid in said transmission when said vehicle operates in said first mode.

16. A method as claimed in claim 15 wherein:

said automatic transmission includes a pump for urging movement of said fluid when said vehicle operates in said first mode; and said decreasing step comprises the step of pumping said fluid out of said transmission into an accumulator during said first mode of operation.

17. A method as claimed in claim 16 wherein said increasing step comprises the step of draining said fluid from said accumulator into said transmission during said second mode of operation.

18. A method as claimed in claim 17 wherein:

said automatic transmission couples to a heat exchanger through a relatively high pressure fluid circuit and a relatively low pressure fluid circuit; and said pumping step comprises the steps of:

coupling said accumulator to said relatively high pressure fluid circuit, and coupling said accumulator to said relatively low pressure fluid circuit.

19. A method as claimed in claim 17 wherein:

during said first mode of operation, said fluid fills said transmission to an operational fluid level; and said draining step comprises the steps of positioning said accumulator above said operational fluid level of said transmission.

20. A method as claimed in claim 17 wherein said draining step comprises the steps of:

configuring said accumulator so that an opening therein resides proximate a bottom side of said accumulator; and coupling said accumulator opening to said transmission.

* * * * *